UNITED STATES PATENT OFFICE.

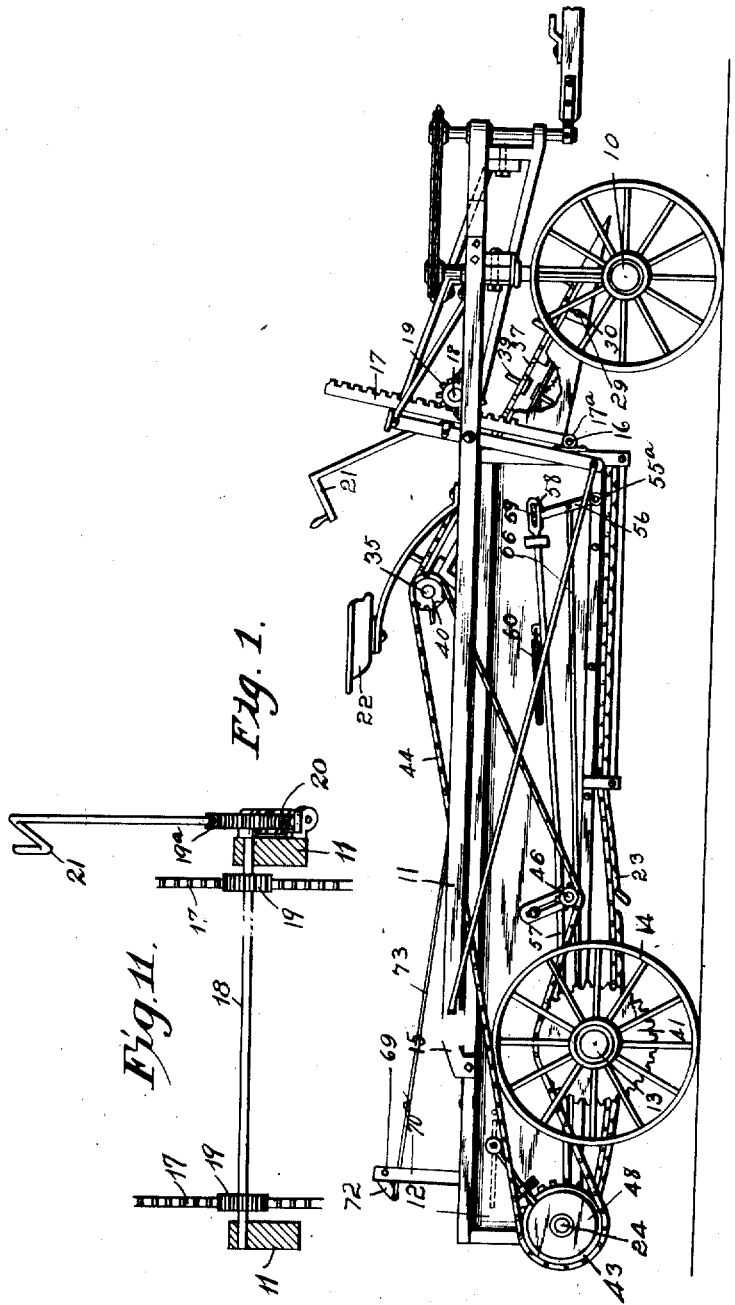

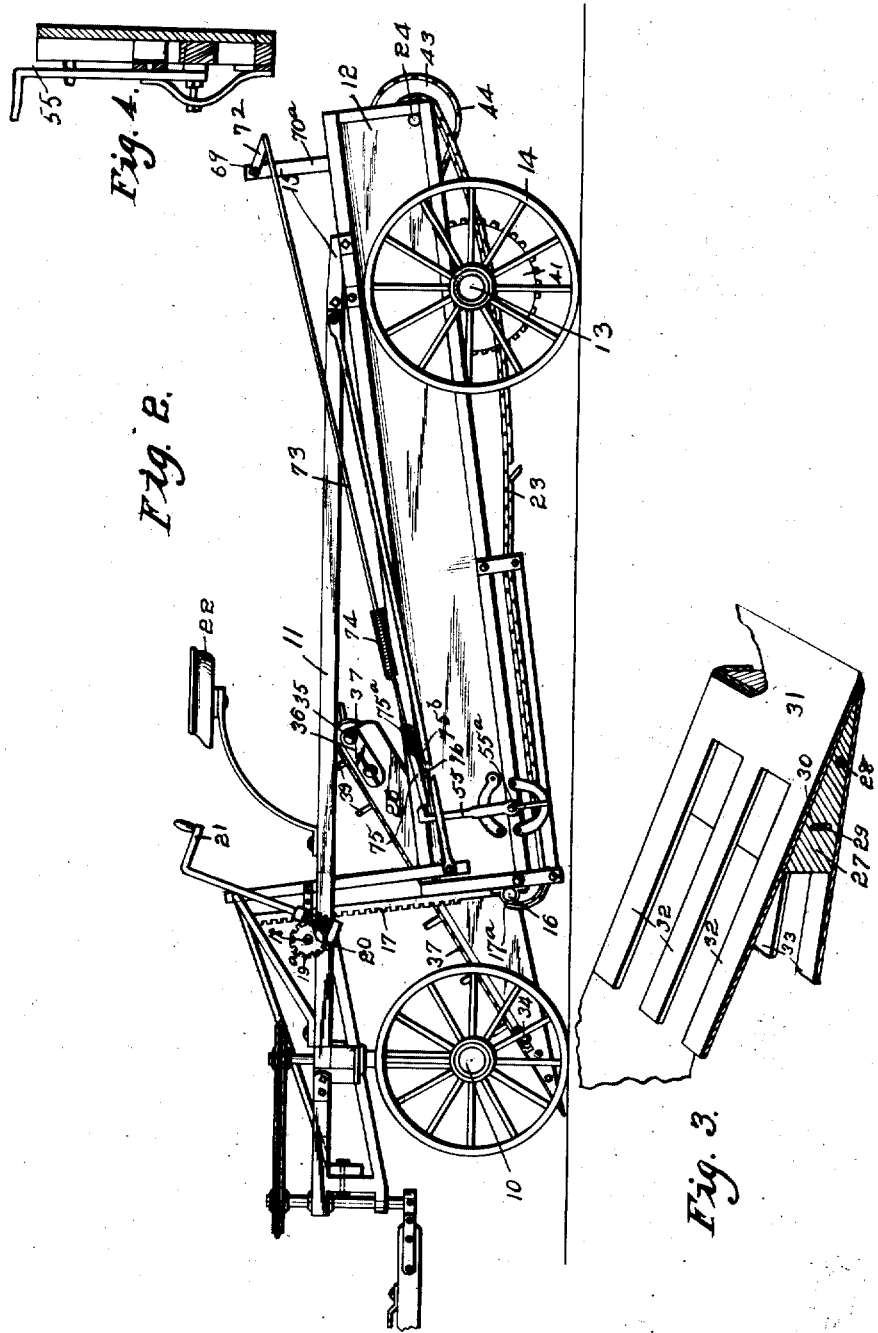

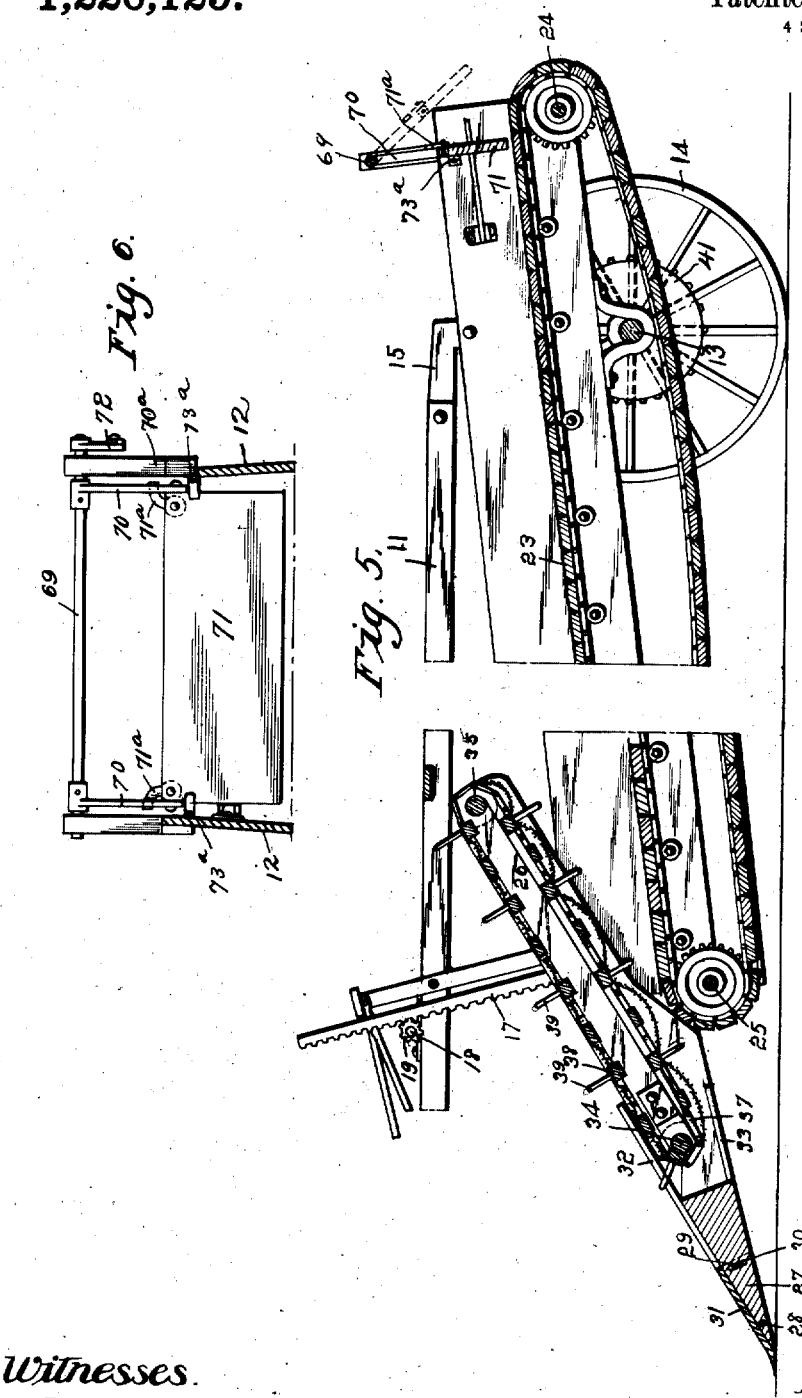

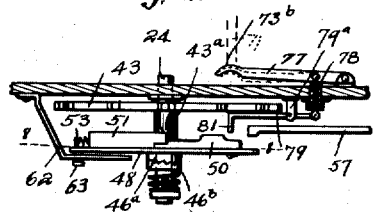
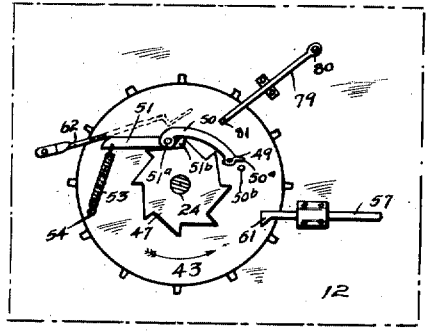
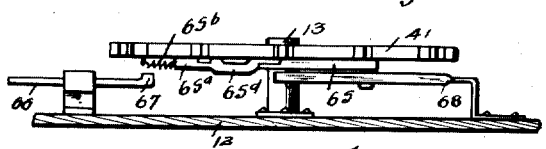
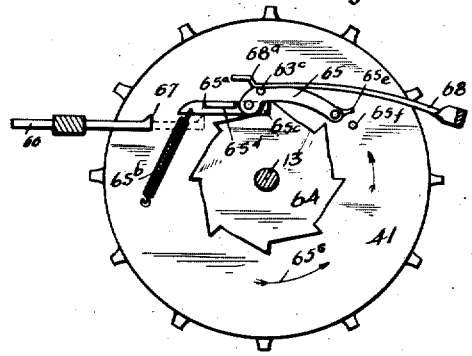

ROBERT SHEDENHELM, OF LADORA, IOWA, ASSIGNOR, BY MESNE ASSIGNMENTS, OF FOUR-TENTHS TO H. S. BUTLER, OF LADORA, IOWA.

MANURE-LOADER.

1,226,125.     Specification of Letters Patent.     Patented May 15, 1917.

Application filed May 11, 1908. Serial No. 432,098.

*To all whom it may concern:*

Be it known that I, ROBERT SHEDENHELM, a citizen of the United States, residing at Ladora, in the county of Iowa and State of Iowa, have invented a new and useful Manure-Loader, of which the following is a specification.

The object of my invention is to provide a device of simple, durable and inexpensive construction, designed to be advanced by any suitable motive power over a barn yard, or a pile of manure, to thereby automatically scrape up manure or other material and load it upon a wagon bed.

A further object is to provide a wagon bed of the kind ordinarily used in manure spreaders, and provided with a movable apron and also provided with an automatic trip device whereby, when the wagon bed has been filled with manure, the trip device will automatically stop further movement of the loading conveyer.

A further object is to provide a wagon bed of this kind having a scraper and loader attached to its forward end, and so arranged that during the loading operation, the forward end of the wagon bed may be tilted downwardly so that the manure or other material being loaded need be elevated only a short distance in order to deliver manure in the wagon bed, and also so arranged that after the wagon bed has been filled, it may be quickly and easily elevated to a horizontal position as required for driving to the point where the manure is to be discharged.

A further object is to provide an improved combined scraper and loader of simple and durable construction, so arranged that the scraper point may be readily and quickly adjusted to suit the requirements, and also to provide a device of this kind in which toothed cross bars on the conveyer are so arranged as to receive manure from the scraper and tear it apart and deliver it into the wagon bed.

A further object is to provide improved means for throwing the movable apron into or out of gear, whereby material may be loaded uniformly throughout the length of the bed, and also whereby the load may be discharged as may be desired.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of the complete manure loader taken from the right side of the machine, with the wagon box in its elevated position.

Fig. 2 shows a side elevation of the complete manure loader showing the wagon bed and scraper in position for loading, and showing the left side of the machine.

Fig. 3 shows a detail perspective view of a portion of the scraper.

Fig. 4 shows a detail view illustrating the lever device for throwing the apron in and out of gear.

Fig. 5 shows a central longitudinal sectional view of the device in the position shown in Fig. 2, the central portion of the wagon bed being removed.

Fig. 6 shows a detail end view illustrating the automatic device for stopping the loading mechanism when the wagon bed is full looking rearwardly from the interior of the wagon bed.

Fig. 7 shows a detail plan view of the automatic device for throwing the conveyer of the loader out of gear.

Fig. 8 shows a sectional view taken on the line 8—8 of Fig. 7.

Fig. 9 shows a detail plan view of the mechanism for throwing the apron of the wagon bed out of gear, and—

Fig. 10 shows a side view of same taken from side of the wagon, shown in Fig. 2. The dotted lines in said figure show the position of the parts when out of gear.

Fig. 11 shows a detail sectional view of the frame; the worm gear mechanism, the racks and the pinions, being shown in front elevation.

Referring to the accompanying drawings, I have used the reference numeral 10 to indicate the forward truck. This truck has attached to it two wagon bed-supporting beams 11. The particular construction of this forward truck is fully illustrated and described in a companion application for Letters Patent filed by me, May 11, 1908, Serial Number 432,099 and hence, the details of the truck will not be specifically set forth herein.

The wagon bed is indicated by the reference numeral 12, and is tiltingly supported upon the rear axle 13, which is rotated from the traction wheels 14 thereon. The beams 11 are connected with the wagon bed above the axle 13 by means of the hinges 15, which permit tilting movement of the wagon bed.

At the forward end of the wagon bed are two racks 17 pivoted to the wagon bed at 17ª, by means of shafts 16 and extended upwardly above the beams 11. Mounted upon the beams 11 is a shaft 18 having a pinion 19 fixed near each end thereof, and in mesh with the adjacent rack 17 as shown in Fig. 1, and in Fig. 11.

I provide for rotating the shaft 18 to raise and lower the racks by means of a worm gear device 20, operated by a crank 21 adjacent to the driver's seat 22 which worm 20 meshes with a gear 19ª on the shaft 18, as shown in Fig. 2. By this arrangement, the forward end of the wagon bed may be raised and lowered by the operator, and will be firmly supported in any position of its adjustment.

Contained within the wagon bed is an endless apron 23 passing around a driving shaft 24 at the rear end of the wagon bed, and an idler shaft 25 at the forward end thereof. The particular construction of the apron forms no part of my present invention.

The scraping and loading device comprises a frame 26 rigidly secured to the forward end of the wagon bed, and inclined downwardly and forwardly.

Pivoted to the forward end of the frame 26 is a solid tapered block 27, mounted on the rod 28, and adjustably connected with the frame 26 by means of a bolt 29 passed through a slot 30 in the block 27, and passed through the sides of the frame 26, thus providing for a limited tilting movement of said block relative to the frame 26.

On top of the block 27 and secured thereto is a steel scraper blade 31, and extending rearwardly from the scraper blade is a series of flat bars 32 spaced apart and extending upwardly beyond the block 27. A similar series of bars indicated by the numeral 33 are arranged below the block 27.

Mounted in the forward portion of the frame 26 between the bars 32 and 33 is a shaft 34, and at the rear end of the frame 26 is a similar shaft 35, the latter being mounted in the adjustable plates 36. An endless conveyer is passed around these shafts, and comprises the sprocket chains 37 and the cross pieces 38, the alternate ones of which are provided with teeth 39, said teeth being arranged to travel between the bars 32 as clearly shown in Fig. 5. By having the plates 36 made adjustable, the tension of the said chain may be regulated to suit the requirements.

On one end of the shaft 35 is a sprocket wheel 40, by which the loading conveyer may be driven, as will hereinafter appear.

The means for driving the loading conveyer and for throwing it into and out of gear, comprises a large sprocket wheel 41 rotatably mounted upon the rear axle 13, a sprocket wheel 43 rotatably mounted on the shaft 24, a sprocket chain 44 passed around the wheels 40 and 43, and over the wheel 41, and a chain tightener sprocket wheel 46 is provided to hold the chain firmly against the top of the wheel 41.

Fixed with relation to the sprocket wheel 43, as for instance by a sleeve 43ª, is a ratchet 47. It will be understood that the sleeve 43ª, the sprocket wheel 43 and the ratchet 47 rotate freely on the shaft 24.

Mounted on the outer end of the shaft 24 is a clutch 46ª, the outer member of which is slidably but non-rotatably mounted on said shaft, and is yieldingly held in engagement with the inner member of the clutch by means of a spring 46ᵇ. The inner member of the clutch 46ª is fixed or formed on a disk 48, rotatably mounted on the shaft 24. Extending from the disk 48 toward the sprocket wheel 43, is a pin 49 on which is pivoted one end of a lever 50 having an extension 50ª. Movement of the lever 50, in one direction is limited by a stop pin 50ᵇ on the disk 48 short enough to clear the head 61, hereinafter referred to, and adapted to limit the movement of the extension 50ª.

Pivoted to the other end of the lever 50 at 51ª is one end of a pawl 51. A portion of the pawl 51 projects beyond the pivotal pivot point 51ª, and on said portion is formed a laterally projecting lug 51ᵇ, adapted to engage the under surface of the lever 50 between the pivot point 51ª and the pivot pin 49. Secured to the outer end of the pawl 51 is a pull spring 53, which is also secured to a pin 54 on the disk 48. On account of the arrangement of the lug 51ᵇ, the spring 53 tends to hold the pawl in engagement with the ratchet 47, and the pawl 51 and lever 50 are prevented from folding away from said ratchet.

It will be seen that so long as the pawl 51 is in engagement with the ratchet 47 and the sprocket wheel 43 is rotated anti-clockwise by the chain 44, the disk 48 and shaft 24 may be rotated in unison therewith for moving the apron rearwardly in the bottom of the bed, while the loading conveyer is being operated.

If it should be desirable to operate the apron 23 by mechanism not here shown, as for purposes of discharging the load, the spring actuated clutch 46ª would make it possible for the shaft 24 to rotate without rotating the sprocket 43. For throwing the apron 23 in the wagon bed out of gear while the loading conveyer 37 is being operated, the following mechanism has been employed.

Extending across the wagon bed is a transverse shaft 55ª. Fixed on the shaft 55ª, as for instance on the left side of the bed, as shown in Fig. 2, is a lever 55. On the other side of the wagon bed, the shaft 55ª has a crank arm 56.

Slidably mounted on the same side of the wagon bed as the crank arm 56 is a rod or bar 57, having an elongated slot 58 at its forward end, in which is received a pin 59 extending from the free end of the crank arm 56. A contractible coil spring 60 which is secured to the side of the wagon bed and to the rod 57, yieldingly tends to hold the rod 57 at the rearward limit of its movement.

On the rear end of the rod 57 is a head 61 so constructed and arranged that when the rod 57 is moved toward the rearward limit of its movement, said head 61 will stand in the path of travel of the pawl 51 and when the sprocket is rotated the pawl 51 will strike the head 61 and be moved out of engagement with the ratchet. Thus when the disk 48 rotates anti-clockwise the pawl 51 engages the head 61. The friction between the pawl and ratchet will hold them in engagement during the first tilting movement of the outer end of the pawl when it engages the head 61. As the rotation of the disk 48 continues, the pawl 51 will reach the position where the head 61 aided by the spring 53 will suddenly jerk the pawl 51 clear of the ratchet 47. So long as the rod 57 is at its rearward limit of movement, the pawl 51 will be kept in its disengaged position, and the sprocket 43 will be permitted to rotate freely without rotating the shaft 24. By manipulation of the lever 55, the rod 57 may be moved forwardly with relation to the machine, thereby drawing the head 61 out of the path of the pawl 51 and permitting said pawl to be drawn into engagement with the ratchet 47 by the spring 53, whereupon the shaft 24 will be rotated in unison with the gear 43. The pawl 51 is wide enough so that the spring 53 may be secured thereto near one side edge and so that the head 61 may clear the spring 53 when the rod 57 is moved toward the rearward limit of its movement and to position in the path of the pawl 51.

For preventing clockwise rotation of the disk 48 when the pawl 51 is held out of engagement with the ratchet 47 by the head 61, mechanism may be employed which will be hereinafter described. It will be seen that when the head 61 holds the pawl 51 out of engagement with the ratchet 47, the tension of the spring 53 will tend to rotate the disk 48 clockwise and if the disk 48 is so rotated on account of said tension or any other cause, the pawl 51 will be permitted to move into engagement with the ratchet 47 and it is this clockwise movement of the disk 48 which is prevented by the following mechanism: Fixed to the side of the wagon bed adjacent to the disk 48 is a resilient arm 62, having at its free end a hook member extending away from which is a curved portion. Extending laterally from the disk 48 is a pin 63 shown in Fig. 7. The arm 62 and the curved portion thereof are so arranged that when the disk 48 rotates anti-clockwise, the pin 63 thereon will strike the curved portion of the arm 62 and push said arm out of the way on each rotation of said disk 48. When, however, the disk 48 is rotated clockwise, the pin 63 will engage the hook member of the arm 62, whereby further clockwise movement of said disk and parts connected therewith, which might be caused by the spring 53 is prevented.

In other words it is necessary to provide means for preventing the clockwise movement of the disk 48, for the reason that when the head 61 raises the pawl 51 out of engagement with the ratchet 47, the spring 53 pulls on the pawl 51 over the head 61 as a fulcrum tending to rotate the disk 48 clockwise until the ratchet 47 is again engaged by the pawl 51. If it were not for the mechanism described for preventing the clockwise rotation of the disk 48, the spring 53 might constantly rotate the disk clockwise a short distance causing the ratchet and pawl to be alternately thrown into and out of engagement.

I have provided means whereby the sprocket 41 on the axle 13 may be thrown into or out of gear with said axle, which will now be described.

The sprocket wheel 41 is rotatably mounted upon the axle 13. Fixed on the axle 13 adjacent to the sprocket 41 is a ratchet wheel 64. A lever 65 is pivotally mounted at one end on the sprocket wheel 41 and is provided with a short extension 65ᵉ adjacent to a stop pin 65ᶠ on the sprocket 41. At its other end the lever 65 is pivoted to one end of a pawl 65ª on which is a lug 65ᶜ similar to the lug on the pawl 51 hereinbefore described, and designed to accomplish the same purpose. A contractible spring 65ᵇ is secured to the sprocket wheel 41 and to the free or outer end of the pawl 65ª and tends to yieldingly hold said pawl in engagement with the ratchet 64. It will thus be seen that when the pawl 65ª is in engagement with the ratchet 64, the rotation of the driving axle 13 and of the ratchet 64 when the machine moves forwardly, will cause the sprocket 41 to rotate clockwise in unison therewith.

Pivoted to the central portion of the crank arm 56 is a rod 66 slidably mounted on the side of the wagon bed. Upon the rear end of the rod 66 is formed a head 67 which is designed when the rod 66 is at the rearward limit of its movement to stand in the path of the laterally projecting portion 65$^d$ of the pawl 65$^a$ and engage the under surface thereof for lifting the pawl out of engagement with the ratchet 64. The axle 13 may then turn freely without rotating the sprocket 41. It may be noted that when the sprocket 41 is rotated from the ratchet 64 it moves clockwise on the wagon, as viewed from the side of the wagon illustrated in Fig. 1, which would be in the direction indicated by the arrow 65$^e$ in Fig. 10. It will also be noted that when the head 67 is below the portion 65$^d$ of the pawl 65$^a$ for holding said pawl out of engagement with the ratchet 64, the spring 65$^b$ will tend to rotate the sprocket 41 in a direction opposite to that indicated by the arrow in Fig. 10, thereby tending to permit the pawl 65$^a$ to drop into engagement with the ratchet 64. For preventing rotation of the sprocket 41 in the direction just indicated, there is mounted on the frame of the machine a spring hook 68, shown in Fig. 10, having on its end a hook member 68$^a$ so constructed and located that when the sprocket wheel 41 moves in the direction indicated by the arrow thereon, a pin 63$^c$ of the lever 65 will engage the spring hook 68 and push the same out of the path of said pin. When, however, the sprocket 41 is rotated in the direction opposite to that indicated by the arrow thereon, the pin 63$^c$ will engage the hook 68$^a$ of the end of the spring hook 68 and limit such movement of the sprocket 41.

When the lever 55 is moved forward to a substantially vertical position, the head 67 of the rod 66 is drawn out of the path of the pawl 65$^a$, and the sprocket wheel 41 allowed to rotate, but this movement of the lever 55 does not operate the bar 57 on account of the length of the slot 58, see Fig. 1, and the operator may, therefore, at will, cause the loading conveyer to be operated, or to be thrown out of operation, and by moving the lever further forward causing the pin 59 to engage the forward end of the slot 58 of the rod 57, he may cause the apron to be thrown into gear without affecting the movement of the loading conveyer. When the lever 55 is at its forward limit of movement so that both of the sprocket wheels 41 and 43 are in gear, then both the loading conveyer and the apron may be moved at the same time.

In practical use with this portion of the device, the parts are usually arranged for loading so that the loading conveyer only is operated. Then when it has deposited a sufficient quantity of manure upon the forward end of the apron, the operator throws the apron gearing devices into gear for a short time, until the portion of the apron that is loaded, is moved back toward the rear end of the wagon bed far enough so that the manure subsequently delivered to the apron will be in front of the quantity previously loaded. That is to say, the apron is permitted to move only a few inches before it is again thrown out of gear.

I have also provided means for automatically throwing the apron out of gear when the load thereon approaches the rear end of the wagon bed, to thereby prevent accidental discharge of the load from the rear end of the wagon bed. This mechanism comprises a shaft 69 rotatably supported above the rear end of the wagon bed in support 70$^a$, and having arms 70 fixed to it, and extended downwardly. Pivotally connected to said arms is a plate 71, which normally hangs downwardly a short distance above the apron.

On the shaft 69 is fixed an arm 72 which normally extends rearwardly and slightly downwardly from said shaft. A lever 75 is pivoted at one end at 75$^a$ on the wagon bed and normally extends forwardly. A rod 73 made in two parts connected by a pull spring 74 is pivoted at one end to the arm 72 and at the other end is pivoted to the lever 75 between the ends thereof at 75$^b$. A stop pin 76 limits the downward movement of the free end of the lever 75.

When the plate 71 hangs in its lower position, the lever 75 is designed to extend downwardly and forwardly from its pivot point in such position that the pivot point 75$^b$ is either in or below the extension of a line passing through the pivot point 75$^a$ and the pivot point where the arm 72 is connected with the rear end of the rod 73. When the parts are in the position just mentioned the tension of the spring 74 tends to draw the arm 72 downwardly and forwardly to position where the plate 71 hangs in its lowermost position and to draw the lever 75 against the stop pin 76. The plate 71 and arms 70 are pivoted together and the plate 71 has on its rear surface ears 71$^a$ overlapping the arms 70 whereby said parts 70 and 71 are so connected that when the plate 71 is moved rearwardly and upwardly by any force acting upon it, it carries with it in such movement the members 70 thereby imparting limited rotation to the shaft 69 and swinging the arm 72 upwardly until the rear end of the rod 73 moves upwardly over center. That is to say, the pivot point of the rear end of the rod 73 is moved upwardly until the shaft 69 lies below the line between said pivot point and the pivot point 75$^b$, whereupon the pull of the spring 74 will tend to draw the pivoted end of the arm 72 forwardly thereby raising it still higher and raising the plate 71 to position out of the way of the discharging load.

When it is desired to lower the plate 71 the lever 75 may be grasped and swung upwardly thus moving the rod 73 rearwardly and permitting the rear end thereof to swing downwardly past center with relation to the shaft 79 and to the line from said shaft to the pivot point 75ᵇ. The lever 75 may then be returned to its first position shown in Fig. 2. The spring 74 will tend to maintain the crank arm 72 in its elevated position. After the load of manure has been discharged from the apron, the plate 71 may be returned to its downwardly extended position by the operator's act of elevating the lever 75, to thereby release the spring 74, whereupon the plate 71 will drop by gravity, and then the lever 75 may be returned to the position shown in Fig. 2.

Pivoted to the inner face of the wagon bed and in front of the plate 71 see Fig. 7 is a lever 77 having a cam portion 73ᵇ near its free end, which is held inwardly by a spring 78. When the plate 71 is in its lower position it engages the cam 73ᵇ on the end of the lever 77 forcing said lever downwardly toward the wall of the wagon bed, as shown by the dotted lines in Fig. 7. When the plate 71 is moved rearwardly and upwardly away from the cam portion 73ᵇ of the lever 77, the spring 78 moves the lever 77 inwardly in the wagon bed.

Pivotally connected to a bracket 79ᵃ on the outside of the wagon bed is an arm 79 to one end of which is pivoted a rod 80, which is slidably extended through the wagon bed wall, and is pivoted to the lever 77, as shown in Fig. 7. The arm 79 has at its lower rear end a portion extending away from the wagon box at a right angle at 81, and is so positioned that when said lower end is moved outwardly by the spring 78, the end 81 will stand in the path of the pawl 51 and thus engage said pawl and throw it out of contact with the ratchet wheel 47, and this will have the effect of causing the sprocket wheel 43 to rotate freely on the shaft 24 without driving it. Therefore, when the load of manure on the apron reaches the rear end of the wagon bed, the means for driving the apron will be automatically thrown out of gear, so that the load will not be thrown out of the rear end of the wagon bed, if the operator should forget to stop the movement of the apron by the lever 55.

In practical use, the forward end of the wagon bed is lowered until the scraper rests upon the ground surface. Then, as the machine is advanced, the scraper will pass under a pile of manure resting on the ground, and the loading conveyer will engage the manure and tear it apart, and throw it upon the forward end of the apron. As soon as the forward end of the apron is full, the operator throws the apron into gear for a short time, until the apron moves rearwardly a few inches. The operation of the loading conveyer continues during this time, and the wagon need not be stopped. Then when the wagon is full, the operator may by manipulating the lever 55, throw the loading conveyer out of gear.

If the operator should neglect to allow the lever 55 to return to its normal position when the apron has reached the rear end of the wagon bed, the apron will be automatically stopped when the load thereon reaches the rear end of the wagon bed. When the apron has been loaded, the operator manipulates the crank 21 and elevates the scraper and the forward end of the wagon bed to the position shown in Fig. 1, whereupon the device is ready to be moved the same as an ordinary wagon.

In the operation of the device a limited quantity of material is first deposited in the front end of the wagon bed, and then the operator manipulates the lever 55, until the apron is moved backward a short distance, the apron then stops until another quantity of material is piled on the apron in front of the material first deposited, this operation of course continues at intervals until the entire apron is filled up and the wagon is loaded. Hence, the lever 35, and its connected parts constitutes a means for moving the conveyer at intervals, and the power for operating the apron is obtained from the traction or supporting wheels.

I claim as my invention:

1. In a device of the class described, the combination of a relatively long and shallow wagon bed, capable of receiving a load of material, and of carrying it from place to place, an apron in the bottom of the wagon bed capable of moving material toward the rear of the wagon bed, said wagon bed being capable of tilting downwardly at its forward end to run close to the ground, a scraper arranged at the forward end thereof, a conveyer interposed between the scraper and the front end of the wagon bed to deliver material from the scraper to the forward end of the wagon bed, and means for operating said conveyer and apron when the wagon bed is in any position of its vertical adjustment.

2. In a device of the class described, the combination of a wagon frame, supporting wheels therefor, a relatively long and shallow wagon bed mounted on the frame, capable of vertical adjustment thereon, a movable apron therein, a scraper at the forward end of the wagon bed, a conveyer between the scraper and the wagon bed, and means operated from a supporting wheel for driving the apron and conveyer when the wagon bed is in any position of its vertical adjustment.

3. In a device of the class described, the combination of a wagon bed, a scraper secured to the forward end thereof, bars fixed to the scraper and extended rearwardly and upwardly toward the wagon bed, a conveyer interposed between the scraper and the wagon bed, said conveyer having toothed cross bars thereon, and said teeth on the cross bars being arranged to travel between said bars on the scraper.

4. In a device of the class described, the combination of a wagon bed, a frame secured to the forward end thereof, and extended downwardly and forwardly, a scraper block tiltingly connected with the forward end of the frame, means for securing it in various positions of its adjustment, bars fixed to the upper portion of the block, and extended upwardly and rearwardly, bars fixed to the lower portion of the block and extended rearwardly, an endless conveyer mounted between the sides of the frame and having cross slats thereon, teeth on the cross slats, said teeth being so arranged as to move upwardly and rearwardly between the upper bars to receive material from the scraper block, and discharge it into the wagon bed.

5. In a device of the class described, the combination of a wagon bed, a frame secured to the forward end thereof, and extended downwardly and forwardly, a scraper block tiltingly connected with the forward end of the frame, means for securing it in various positions of its adjustment, bars fixed to the upper portion of the block and extended upwardly and rearwardly, bars fixed to the lower portion of the block and extended rearwardly, an endless conveyer mounted between the sides of the frame and having cross slats thereon, teeth on the cross slats, said teeth being so arranged as to move upwardly and rearwardly between the upper bars to receive material from the scraper block and discharge it into the wagon bed, and means operated upon the advance of the wagon bed for moving the conveyer.

6. In a device of the class described, the combination of a wagon-bed, means for tiltingly supporting it so that its forward end may be moved close to the ground surface, a scraper fixed to the forward end of the wagon-bed, an apron carried by the wagon bed, means operated upon an advance of the wagon for moving the conveyer, and manually controlled means for interrupting the movement of the conveyer whereby the material deposited upon the forward end of the apron may be moved rearwardly in the wagon-bed until the entire wagon-bed has been filled.

7. In a device of the class described, the combination of a forward truck, a frame connected with the forward truck, a wagon bed, supporting wheels at the rear end of the wagon bed, said frame being pivotally connected with the wagon bed above the rear supporting wheels, means connected with the forward end of the frame and with the forward end of the wagon bed for adjusting the wagon bed vertically, and securing it in different positions of its adjustment, and a scraper secured to the forward end of the wagon bed.

8. In a device of the class described, the combination of a forward truck, a frame connected with the forward truck, a wagon bed, supporting wheels at the rear end of the wagon bed, said frame being pivotally connected with the wagon bed above the rear supporting wheels, two racks pivoted to the forward end of the wagon bed, two pinions mounted on the frame to engage said racks, a worm gear device mounted on the frame for rotating said pinions, and a scraper secured to the forward end of the wagon bed.

9. In a device of the class described, the combination of a wagon bed, an apron in the bottom of the wagon bed, means for advancing the apron, means for loading material on the forward end of the apron, and a device arranged at the rear end of the wagon bed designed to be engaged by material on the apron, and means operated by said device for throwing the apron out of gear.

10. In a device of the class described, the combination of a wagon bed, supporting wheels therefor, an apron mounted in the wagon bed, means driven by a supporting wheel for advancing the apron, means for loading material upon the forward end of the apron, a trip device at the rear end of the wagon bed designed to be engaged by material on the apron, and means operated by said trip device for throwing the apron out of gear.

11. In a device of the class described, the combination of a wagon bed, supporting wheels therefor, an apron in the bottom of the wagon bed, a scraper at the forward end of the wagon bed, a conveyer interposed between the scraper and the wagon bed, means for operating both the conveyer and the apron by power from a supporting wheel, and means for throwing the conveyer out of gear and means for throwing the apron out of gear.

12. In a device of the class described, the combination of a wagon bed, supporting wheels therefor, an apron in the bottom of the wagon bed, a scraper at the forward end of the wagon bed, a conveyer interposed between the scraper and the wagon bed, means operated by a supporting wheel for moving the conveyer and the apron, manually operated means for throwing the apron out of gear, manually operated means for throwing the conveyer out of gear, and automatic means acted on by a load on the apron, for throwing the apron out of gear when the load reaches the rear end of the wagon bed.

13. In a device of the class described, the combination of a wagon bed, supporting wheels therefor, a loader at the forward end of the wagon bed, an apron mounted in the bottom of the wagon bed, means operated by a supporting wheel for advancing the apron, an arm pivoted inside of the wagon bed and extended rearwardly, means for throwing said arm inward, and means connected with said arm for throwing the apron out of gear when the arm is pressed toward the center of the wagon bed.

14. In a device of the class described, the combination of a wagon bed, supporting wheels therefor, a loader at the forward end of the wagon bed, an apron mounted in the bottom of the wagon bed, means operated by a supporting wheel for advancing the apron, an arm pivoted inside of the wagon bed and extended rearwardly, means for throwing said arm inward, means connected with said arm for throwing the apron out of gear when the arm is pressed toward the center of the wagon bed, a shaft supported above the rear end of the wagon bed, arms extended downwardly from said shaft, a plate pivoted to said arms and arranged to be engaged by a load on the apron, said plate when moved rearwardly being designed to disengage said arm and allow it to be moved toward the center of the wagon bed.

15. In a device of the class described, the combination of a wagon bed, supporting wheels thefefor, a loader at the forward end of the wagon bed, an apron mounted in the bottom of the wagon bed, means operated by a supporting wheel for advancing the apron, an arm pivoted inside of the wagon bed and extended rearwardly, means for throwing said arm inward, means connected with said arm for throwing the apron out of gear when the arm is pressed toward the center of the wagon bed, a shaft supported above the rear end of the wagon bed, arms extended downwardly from said shaft, a plate pivoted to said arms and arranged to be engaged by the load on said apron, said plate when moved rearwardly being designed to disengage said arm and allow it to be moved toward the center of the wagon bed, and means for automatically supporting said plate in an elevated position after it has been moved rearwardly.

16. In a device of the class described, the combination of a wagon bed, supporting wheels therefor, a loader at the forward end of the wagon bed, means operated by a supporting wheel for advancing the apron, an arm pivoted inside of the wagon bed and extended rearwardly, means for throwing said arm inward, means connected with said arm for throwing the apron out of gear when the arm is pressed toward the center of the wagon bed, a shaft supported above the rear end of the wagon bed, arms extended downwardly from said shaft, a plate pivoted to said arms and arranged to be engaged by the load on said apron, said plate when moved rearwardly being designed to disengage said arm and allow it to be moved toward the center of the wagon bed, and means for automatically supporting said plate in an elevated position after it has been moved rearwardly, said means comprising a crank arm on the shaft, a rod pivoted to the crank arm, a spring connected with the rod and a lever pivoted to the wagon bed and having said rod attached to it substantially as set forth.

17. In a device of the class described, the combination of a wagon bed, an apron mounted in the wagon bed, supporting wheels for the wagon bed, a sprocket wheel rotatably connected with one of the supporting wheels, means actuated by said sprocket wheel for driving the apron, a ratchet wheel fixed to one of the supporting wheels adjacent to said sprocket wheel, a lever pivoted to the sprocket wheel, a pawl pivotally connected to the lever and designed to engage the ratchet wheel, a spring for normally holding the pawl in engagement with the ratchet wheel, a rod slidingly mounted, and manually operated means for moving said rod into position in the path of the pawl, so that as the sprocket wheel rotates, the said pawl will engage said arm and be thrown out of engagement with the ratchet wheel.

18. In a device of the class described, the combination of a wagon bed, an apron mounted in the wagon bed, supporting wheels for the wagon bed, a sprocket wheel rotatably connected with one of the supporting wheels, means actuated by said sprocket wheel for driving the apron, a ratchet wheel fixed to one of the supporting wheels adjacent to said sprocket wheel, a lever pivoted to the sprocket wheel, a pawl pivotally connected to the lever and designed to engage the ratchet wheel, a spring for normally holding the pawl in engagement with the ratchet wheel, a rod slidingly mounted, and manually operated means for moving said rod into position in the path of the pawl, so that as the sprocket wheel rotates, the said pawl will engage said arm and be thrown out of engagement with the ratchet wheel, and means for preventing a backward rotation of the sprocket wheel, comprising a spring actuated hook fixed to a stationary support and designed to engage the supporting pin of said lever when the sprocket wheel is rotated in a direction that would tend to move the apron in the reverse direction required in use.

19. In a device of the class described, the combination of a wagon bed, supporting wheels therefor, an apron, a shaft for operating the apron, a loader, a shaft for operating the loader, a sprocket wheel operatively connected with one of the supporting wheels, a sprocket wheel fixed to the shaft of the loader, a sprocket wheel loosely mounted on the apron shaft, a chain for operatively connecting these sprocket wheels, a ratchet wheel fixed to the sprocket wheel on the apron shaft, a spring actuated clutch on the outer end of said shaft, a disk fixed to the inner member of the clutch, a pin fixed to the said disk and extended toward the sprocket wheel on the apron shaft, a lever pivoted to said pin, a pawl pivotally connected with said lever, a spring for normally holding the pawl in engagement with said ratchet wheel, a rod slidingly supported in the path of said pawl, means for manually operating the rod to draw it out of the path of the pawl, said parts being so arranged that as the disk is rotated, the pawl will engage said rod and be moved thereby to position out of engagement with the ratchet wheel, and a second rod pivotally mounted and capable in one position of standing in the path of the pawl to throw it out of engagement with the ratchet wheel, and means for automatically operating said pivoted rod, said means being actuated by a load upon the apron.

20. In a device of the class described, the combination of a frame, supporting wheels for the frame, a wagon-bed tiltingly mounted in the frame and capable of having its forward end moved downwardly close to the ground, means for raising and lowering the forward end of the wagon-bed, a scraper fixed to the forward end of the wagon-bed, and capable of up and down movement with it, a conveyer arranged to receive material from the scraper and to carry it upwardly and rearwardly between the sides of the wagon-bed to deposit it in the forward portion of the wagon-bed, means for operating said conveyer by power from a supporting wheel, and means for throwing said apron into and out of gear, and an apron carried by the wagon-bed, and means operated by one of the supporting wheels for advancing the apron, and means for throwing the apron into and out of gear.

21. An excavator comprising a body portion, traction wheels supporting said body portion, a conveyer horizontally located in said body portion, means operatively connecting said conveyer with a traction wheel whereby the said conveyer is moved at intervals, an earth elevating conveyer attached to said body portion, and earth cutting means attached to the last said conveyer, and a means operatively connected with a traction wheel, for imparting movement to the earth elevating conveyer.

22. In a device of the class described, the combination of a frame mounted on wheels with a bed mounted on said frame, means for vertically adjusting the forward end of said bed, a second frame carried by said forward end, a scraper carried by said second frame, shafts carried by said second frame, one of said shafts being adjustable, and a conveyer on said shafts.

Des Moines, Iowa, March 26, 1908.

ROBERT SHEDENHELM.

Witnesses:
RALPH ORWIG,
A. G. HAGUE.